United States Patent
Hakobyan et al.

(10) Patent No.: US 10,162,049 B2
(45) Date of Patent: Dec. 25, 2018

(54) METHOD FOR OPERATING A RADAR APPARATUS

(71) Applicant: Robert Bosch GmbH, Stuttgart (DE)

(72) Inventors: Gor Hakobyan, Stuttgart (DE); Siegbert Steinlechner, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 336 days.

(21) Appl. No.: 15/172,658

(22) Filed: Jun. 3, 2016

(65) Prior Publication Data

US 2016/0356885 A1 Dec. 8, 2016

(30) Foreign Application Priority Data

Jun. 8, 2015 (DE) .................. 10 2015 210 454

(51) Int. Cl.
| | |
|---|---|
| *G01S 13/93* | (2006.01) |
| *G01S 7/35* | (2006.01) |
| *G01S 13/34* | (2006.01) |
| *G01S 13/58* | (2006.01) |

(52) U.S. Cl.
CPC ............ *G01S 13/584* (2013.01); *G01S 7/352* (2013.01); *G01S 13/346* (2013.01); *G01S 13/347* (2013.01); *G01S 13/931* (2013.01); *G01S 2007/356* (2013.01)

(58) Field of Classification Search
CPC .... G01S 13/584; G01S 13/931; G01S 13/347; G01S 7/352; G01S 13/346; G01S 2007/356

USPC ........................................ 342/107
See application file for complete search history.

(56) References Cited

U.S. PATENT DOCUMENTS

| | | | | |
|---|---|---|---|---|
| 8,081,105 B2* | 12/2011 | Tigrek | ................. | G01S 13/28 342/104 |
| 8,884,811 B2* | 11/2014 | Zwick | ................. | G01S 13/003 342/159 |
| 9,176,223 B2* | 11/2015 | Derham | ................. | G01S 7/36 |
| 2004/0257270 A1* | 12/2004 | Poullin | ................. | G01S 7/414 342/159 |
| 2011/0279305 A1* | 11/2011 | Lellouch | ................. | G01S 7/003 342/107 |

* cited by examiner

*Primary Examiner* — Frank J McGue
(74) *Attorney, Agent, or Firm* — Norton Rose Fulbright US LLP; Gerard Messina

(57) ABSTRACT

A method for operating a radar apparatus having transmitting antennas and at least one receiving antenna, including: generating transmission spectra by complex modulation of mutually equidistant orthogonal OFDM subcarriers; transforming the transmitted spectra into the time domain; digital/analog conversion, high-frequency modulation of the transmitted spectra, and simultaneous emission of the modulated transmitted spectra via the transmitting antennas; demodulating and digitizing a received signal; generating one received spectrum per transmitted spectrum, a division of the OFDM subcarriers corresponding to their division in the transmitted spectra being carried out; eliminating the transmitted signal forms of the transmitted spectra from the received spectra; generating one radar image per received spectrum; evaluating the radar images in a distance dimension and in a speed dimension; and carrying out a signal evaluation for the received signal.

9 Claims, 4 Drawing Sheets

METHOD FOR OPERATING A RADAR APPARATUS

CROSS REFERENCE

The present application claims the benefit under 35 U.S.C. § 119 of German Patent Application DE 102015320454.0 filed on Jun. 8, 2015, which is expressly incorporated herein by reference in its entirety.

FIELD

The present invention relates to a method for operating a radar apparatus. The present invention further relates to a radar apparatus.

BACKGROUND INFORMATION

Radar systems for measuring a distance, relative speed, and angle of objects (e.g., of vehicles, obstacles, etc.) are increasingly being used for safety and convenience functions in motor vehicles. So-called multiple-input multiple-output (MIMO) systems, in which multiple transmitting and receiving antennas are used, are increasingly being utilized. Particularly accurate angle estimates can be made with the aid of the MIMO principle, the antenna aperture (antenna area), which is important for angle estimation, being virtually enlarged. Here multiple transmitting antennas emit their signals without mutual influence, the signals being divided among the reception channels. The virtual enlargement of the aperture is achieved by the fact that the spacing of the transmitting antennas is different from the receiving antennas; it is thus possible to proceed computationally as if only a single transmitting antenna were present, but the number of receiving antennas is multiplied and what results virtually is a greater width and/or height of the antenna aperture.

Separation of the signals of the various transmitting antennas can be accomplished in the frequency domain or time domain. The separation is often effected in the time domain, i.e. the antennas transmit successively on a time division multiplexed (TDM) basis. A disadvantage here is that the measurement time increases due to the sequential measurement, and objects may have moved appreciably during the extended measurement time, which can decrease measurement accuracy.

Another separation possibility is separation in the frequency domain (frequency multiplexing). Here different antennas occupy different frequency ranges at the same point in time. A disadvantage of this method is the reduced available bandwidth for each transmission channel. The distance separation capability of a radar system is directly proportional to its bandwidth, with the result that the distance separation capability can be decreased with conventional frequency multiplexing.

The statements above apply regardless of the modulation method used. Typical transmission frequencies nowadays are 24 GHz or 77 GHz; maximum bandwidths that can be occupied are less than approx. 4 GHz, but typically appreciably less, for example approx. 0.5 GHz.

Present-day motor vehicle radar systems generally use FMCW modulation, in which multiple linear frequency ramps of different slopes are successively cycled through. Mixing the instantaneous transmitted signal with the received signal yields a low-frequency signal whose frequency is proportional to distance but which also contains an additive/subtractive component thanks to a Doppler frequency that is proportional to the relative speed.

Separation of distance and speed information for multiple targets is accomplished with a complicated and relatively error-prone method in which the results of the various ramps are combined with the results of measurements performed earlier.

More recent systems use FMCW modulation with considerably faster ramps (chirp modulation), with the result that the Doppler shift within a ramp becomes negligible. The distance information obtained therefrom is largely unequivocal, and a Doppler shift can then be determined by observing the development over time of the phase of the complex distance signal.

In the future, digital modulation methods will also play an important role in motor vehicle radar systems. Digital modulation methods such as orthogonal frequency division multiplexing (OFDM) are already being used in some communications applications (e.g. WLAN, LTE, DVB-T).

SUMMARY

An object of the present invention is to furnish an improved method for operating a MIMO radar apparatus.

According to a first aspect of the present invention, the object may be achieved with a method for operating a radar apparatus having at least two transmitting antennas and at least one receiving antenna, having the following steps of:
  generating transmission spectra by complex modulation of mutually equidistant orthogonal OFDM subcarriers, each transmitted spectrum for each of the transmitting antennas having a defined number of discrete OFDM subcarriers, all the transmitted spectra having substantially the same bandwidth, OFDM subcarriers being divided non-overlappingly and substantially non-equidistantly among the transmitted spectra, each transmitted spectrum having at least two directly adjacent OFDM subcarriers;
  transforming the transmitted spectra into the time domain;
  digital/analog conversion, high-frequency modulation of the transmitted spectra, and simultaneous emission of the modulated transmitted spectra by way of the transmitting antennas;
  demodulating and digitizing a received signal received by the receiving antenna;
  generating one received spectrum per transmitted spectrum, a division of the OFDM subcarriers corresponding to their division in the transmitted spectra being carried out;
  eliminating the transmitted signal forms of the transmitted spectra from the received spectra;
  generating one radar image per received spectrum;
  evaluating the radar images in a distance dimension and in a speed dimension; and
  carrying out a signal evaluation for the received signal.

An intermediate result of a measurement, in the form of peaks, is thereby achieved, and a distance and a speed of objects can be ascertained from indices of the peaks. The distance separation capability can thereby be maintained without impairment as compared with a conventional combination of OFDM and MIMO; advantageously, an unequivocally estimatable distance range is not reduced.

According to a second aspect, the object may be achieved with a radar apparatus having:
  a generating device for generating transmitted spectra by complex modulation of mutually equidistant orthogonal OFDM subcarriers, each transmitted spectrum for each of the transmitting antennas having a defined number of discrete OFDM subcarriers, all the transmitted spectra having substantially the same bandwidth, OFDM subcarriers being divisible non-overlappingly and substantially non-equidistantly among the transmitted spectra, each transmitted spectrum having at least two directly adjacent OFDM subcarriers;

a first processing device by way of which the transmitted spectra are digital/analog convertible and high-frequency modulatable;

at least two transmitting antennas for simultaneous transmission of the two transmitted spectra;

at least one receiving antenna for receiving a received spectrum;

a second processing device for demodulation and analog/digital conversion of the received signal; and an evaluation device for generating the received spectrum from the received signal and separating the transmitted spectra, a division of the OFDM subcarriers corresponding to their division in the transmitted spectra being capable of being carried out, the transmitted spectra being capable of being eliminated from the received spectra, one radar image being capable of being generated per transmit/receive path, the radar images being capable of being evaluated in a distance dimension and in a speed dimension, a further signal evaluation for the received signal being capable of being carried out.

Advantageously, the present invention furnishes a combination of MIMO radar with OFDM modulation which avoids degradation of a separation capability or resolution capability. Improved estimation of targets is thereby assisted. With the present invention, in a context of utilization of multiple transmitting antennas that implicitly offers improved angle estimation capability, an unequivocally measurable distance domain and maximum possible separation capability are retained.

An advantageous refinement of the method provides that for peak values of the radar images an angle estimate for an ascertained target is carried out. Particularly accurate detection and localization of targets can thereby be implemented.

A further advantageous refinement of the method provides that the non-equidistant OFDM subcarriers are disposed pseudo-randomly in the transmitted spectra. A capability for implementing an advantageous non-equidistant pattern of the OFDM subcarriers in the transmitted spectra is thereby furnished.

A further advantageous refinement of the method provides that the number of OFDM subcarriers is a power of two. This is particularly advantageous for implementing efficient and fast execution of a Fourier transform.

A further advantageous refinement of the method provides that the transmitted spectra transformed into the time domain, or the division of the transmitted spectra among the transmitting antennas, is modified during a measurement operation. An even more efficient mode of operation of the method is advantageously thereby assisted.

A further advantageous refinement of the method provides that a radar cross section of a target is estimated. A further important parameter of detected targets can thereby be estimated.

The present invention is described in detail below, with further features and advantages, on the basis of several Figures. All the features described or depicted, individually or in any combination, constitute the subject matter of the invention, regardless of their formulation or depiction respectively in the description and in the figures. Conventional principles of a MIMO radar will not be discussed further. Identical or functionally identical elements have identical reference characters.

DETAILED DESCRIPTION OF EXAMPLE EMBODIMENTS

Figure 1:
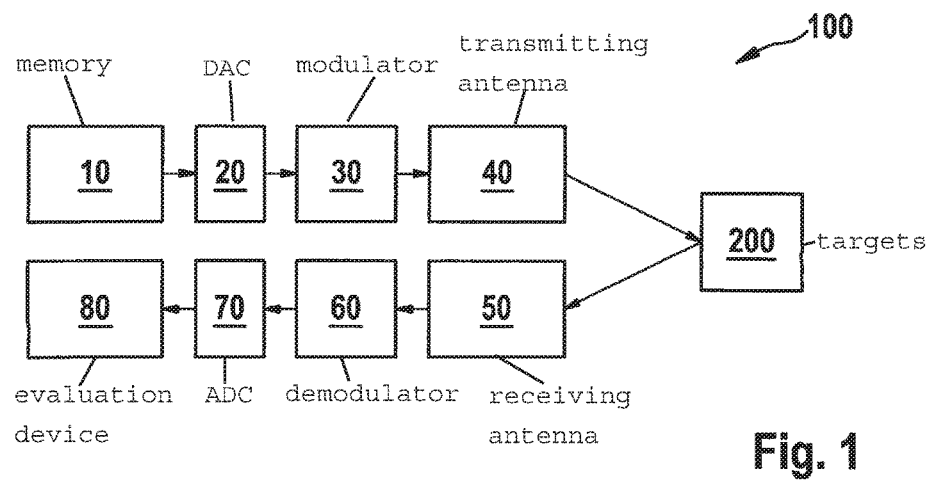
FIG. 1 shows a conventional radar system based on OFDM.

FIG. 1 is an overview circuit diagram of a radar apparatus 100 based on an orthogonal frequency division multiplexing (OFDM) method. A transmitted signal is generated by way of devices 10, 20, 30 as follows:

Firstly, a selection is made of N (for example, N=1,024) discrete equidistant transmitted frequencies $f_i$, or OFDM subcarriers, that are to be sent out, using the following mathematical equation:

$$f_1 = f_0 + (i-1) \cdot df, \ i=1 \ldots N \qquad (1)$$

$f_0$=beginning of the transmission band (e.g. 77 GHz),
df=line mode separation of the transmission frequency $f_1$.

For each of the transmission frequencies $f_i$ a complex amplitude $a_i$ is selected:

$$TX = [a_1 \ a_2 \ldots a_N] \qquad (2)$$

where the vector TX represents a complex discrete transmitted spectrum (referred to the transmitted frequencies $f_i$).

Complex sampled values of a baseband transmitted signal are generated therefrom by an inverse fast Fourier transform iFFT(TX); those values are stored in an electronic memory device 10 (e.g. a RAM) from which they can be cyclically read out. Calculation of the sampled values by inverse fast Fourier transformation can be accomplished beforehand when the system is designed, and need not occur in real time.

A D/A converter 20 generates, from the sequence that is read out periodically from memory device 10, a cyclical complex analog baseband signal having the frequencies $f_i$=0, df, 2*df, (N−1)*df.

The baseband transmitted signal is shifted into the desired frequency range (e.g. 77-78 GHz) by way of a single sideband HF modulator 30 and an oscillator (not depicted, for example having a resonant frequency $f_0$=77 GHz), and then radiated through a transmitting antenna 40.

The transmitted signal is reflected at one or several targets 200 and travels to a receiving antenna 50. For the case in which a k-th target 200 is at a distance $d_k$ from radar apparatus 100, the echo delay time $t_k$ is:

$$t_k = \frac{2 \cdot d_k}{c} \qquad (3)$$

c=speed of light ($3*10^8$ m/s).

The i-th transmitted frequency $f_i$ experiences, as a result of the k-th target 200, a phase shift $\varphi_{i,k}$ of:

$$\varphi_{i,k} = 2 \cdot \pi \cdot f_i \cdot t_k = \frac{4 \cdot \pi \cdot f_i \cdot d_k}{c}. \quad (4)$$

The consequence thereof for the received spectrum RX (analogously to the transmitted spectrum TX) at receiving antenna 50 is that each transmitted frequency experiences a phase shift dependent on the distances of targets 200, as well as an attenuation $v_k$ dependent on the target distance and on the reflective properties of the k-th target 200. The following thus applies to the received spectrum RX:

$$RX = [b_1 \; b_2 \; \ldots \; b_N] \quad (5)$$

bi (i=0 to N−1)=complex amplitudes at the transmitted frequencies $f_i$.

For the complex amplitudes $b_i$ the following applies:

$$b_i = a_i \cdot \sum_{k=1}^{K} v_k \cdot e^{-j\varphi_{i,k}} = a_i \cdot \sum_{k=1}^{K} v_k \cdot e^{-j\frac{4\pi \cdot f_i \cdot d_k}{c}} \quad (6)$$

j=imaginary unit of the complex numbers.

Processing of the analog received signal is accomplished as follows:

An HF demodulator 60 undoes the frequency shift of HF modulator 30. A baseband signal having frequencies 0, df, 2*df, . . . , (N−1)*df is therefore present at A/D converter 70 and is converted by A/D converter 70 into a digital complex time signal.

From this, the numerical values $b_i$ of the spectrum RX are calculated with a fast Fourier transform.

The dependence of the complex transmitted amplitudes $b_i$ is eliminated by an element-wise division of the received spectrum by the transmitted spectrum, which effects a spectral normalization of the received spectrum. This yields a spectrum Q of the transfer pathway from radar apparatus 100 to targets 200 and back to radar apparatus 100, having the spectral lines $q_i$:

$$q_i = \frac{b_i}{a_i} = b_i \cdot \frac{a_i^*}{|a_i|^2} = \sum_{k=1}^{K} v_k \cdot e^{-j\frac{4\pi \cdot f_i \cdot d_k}{c}}. \quad (7)$$

Preferably, the division by $a_i$ is replaced by an equivalent but less complex multiplication by the value $(a_i^*/|a_i|^2)$, which can be calculated a priori. Here $a_i^*$ is the complex value conjugated with $a_i$. Preferably all the amplitudes $|a_i|$ are selected to be equal.

It is evident that for each target 200 (k=1, . . . , K) a complex oscillation occurs over the values $q_i$, the phase evolution of said oscillation over the index i being proportional to the target distance dk.

If the spectrum Q of the transfer pathway is subjected to an inverse fast Fourier transform, what is obtained is the impulse response of the transfer pathway; each local maximum designates the distance $d_k$ and the echo amplitude of a target 200.

In the evaluation of distance and speed, the received signals are therefore HF-demodulated, digitized, spectrally normalized, and evaluated in two-dimensional space (distance d, speed v), in the manner described above. One complex oscillation per target 200 occurs in each of the two dimensions, the frequency of that oscillation corresponding respectively to the distance and speed of target 200 in relation to radar apparatus 100.

Figure 2:
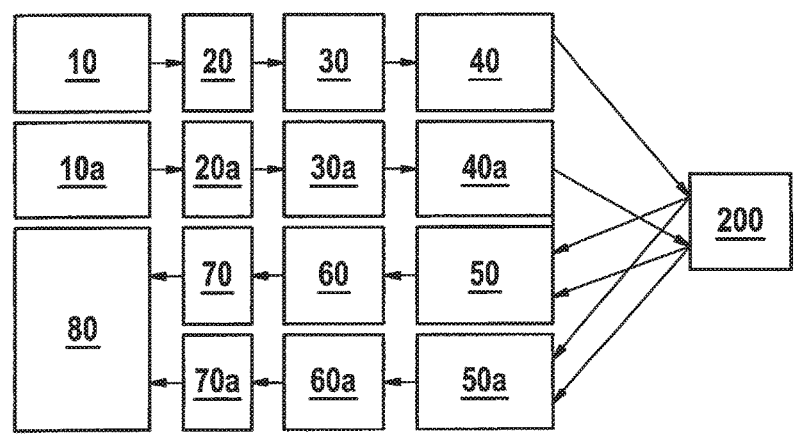
FIG. 2 shows an embodiment of a radar apparatus according to the present invention.

According to an example embodiment of the present invention, a specific MIMO radar apparatus having at least two transmitting antennas and at least one receiving antenna is provided. FIG. 2 shows an embodiment of a radar apparatus 100 according to the present invention having, for example, two transmission paths and two reception paths.

Radar apparatus 100 is based on the conventional radar apparatus 100 of FIG. 1, but now two D/A converters 20, 20a, two HF modulators 30, 30a, and two transmitting antennas 40, 40a are provided for each transmission path. The reception path encompasses respectively at least one receiving antenna 50, 50a, two HF demodulators 60, 60a, and two A/D converters 70, 70a. The signals received in the reception paths are evaluated using an evaluation device 80.

In radar apparatus 100 of FIG. 2 the equidistant transmitted spectrum TX is firstly subdivided into two non-equidistant transmitted sub-spectra TX1, TX2. The transmitted spectrum TX is divided among the number of transmitting antennas 40, 40a that are present, thereby implementing a particular kind of frequency multiplexing.

Figure 3:
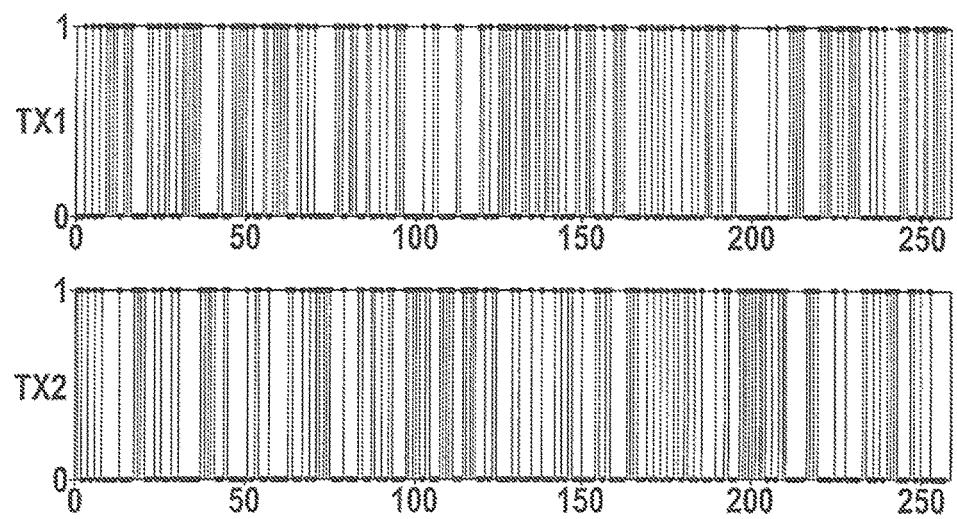
FIG. 3 shows an embodiment of a non-equidistant division pattern of OFDM subcarriers among transmitted spectra.

FIG. 3 shows an exemplifying pseudo-random division of N=256 equidistant frequency lines $f_i$, or OFDM subcarriers, among two non-equidistant sub-spectra TX1, TX2. The top portion of FIG. 3 depicts the non-equidistant sub-spectrum TX1 for first transmitting antenna 40, and the lower illustration shows the non-equidistant sub-spectrum TX2 for second transmitting antenna 40a. A value "1" in the respective illustration means that the frequency line $f_i$ is present; a value "0" means that the frequency line $f_i$ is not present.

"Non-equidistant" means in this connection that in terms of the overall frequency range, the frequency lines $f_i$ of the two sub-spectra TX1, TX2 are predominantly at non-equal distances from one another. Directly adjacent OFDM subcarriers must, however, be present in at least a sub-region of the two sub-spectra TX1, TX2; advantageously, several such regions having directly adjacent OFDM subcarriers are present. The minimum distance between the individual frequency lines $f_i$ or OFDM subcarriers determines the frequencies up to which an estimate can be carried out, those frequencies corresponding to the distances from target 200. The higher an unequivocally measurable frequency, the greater an unequivocally measurable distance range to target 200.

The result is to furnish, in this manner, non-overlapping or complementary sub-spectra TX1, TX2; this means that for a sub-spectrum TX1, TX2 in which a frequency line is present, the other sub-spectrum TX1, TX2 does not contain that frequency line.

The division is effected in such a way that each sub-spectrum TX1, TX2 contains the same number (in the example shown, 128) of frequency lines $f_i$ or OFDM subcarriers. The spectrum is defined for each transmitting antenna 40, 40a in such a way that all the OFDM subcarriers for both sub-spectra TX1, TX2 are assigned non-overlappingly. The time signal is thereby generated separately for each of the transmitting antennas 40, 40a. After a shift into the HF band using HF modulators 30, 30a, transmitted spectra TX1, TX2 are transmitted simultaneously by way of the associated transmitting antennas 40, 40a, the first sub-spectrum TX1 being transmitted via first transmitting antenna 40 and the second sub-spectrum TX2 being transmitted via second transmitting antenna 40a.

The advantage of this kind of non-equidistant division of the overall transmitted spectrum TX among two or more channels is that almost the entire frequency band N*df is occupied in all channels, which optimizes the separation capability of radar apparatus 10 for targets 200 located close together. Because of the close proximity of the spectral lines or OFDM subcarriers at least in sub-regions of transmitted spectra TX1, TX2, which is proportional to an unequivocality region (i.e., a maximum distance of a target 200 which can still be unequivocally evaluated) of radar apparatus 100, the unequivocality region of radar apparatus 100 is optimized. It is thereby possible for a number of transmitting antennas to be greater as compared with time-multiplexed systems, since the measurement time does not increase.

In a variant, provision can be made that the complex modulation symbols (OFDM symbols) that are transmitted on the OFDM subcarriers, as well as the division pattern of the OFDM subcarriers among the sub-spectra TX1, TX2, are modified during a measurement.

Figure 4:
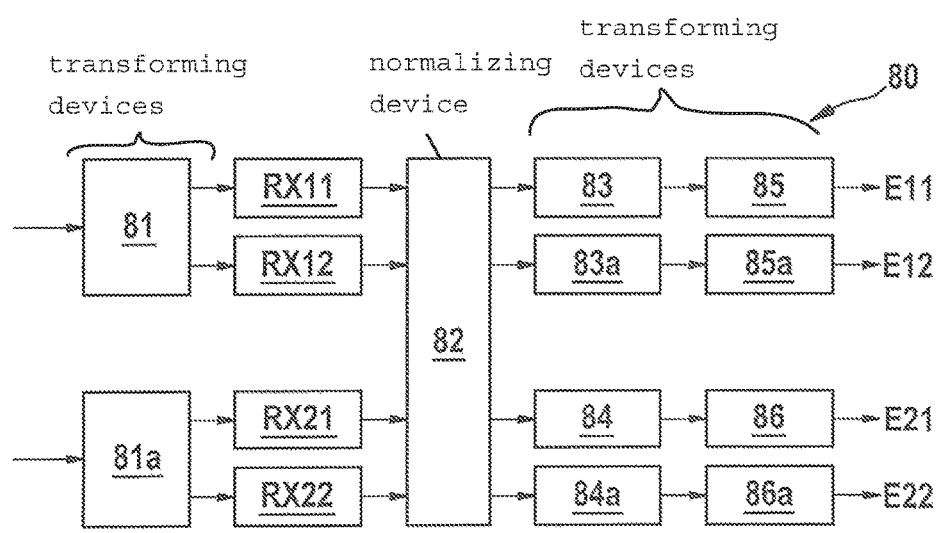
FIG. 4 shows an evaluation device of the radar apparatus according to the present invention.

FIG. 4 shows an evaluation device 80 with which the received signals of receiving antennas 50, 50a are evaluated.

Firstly, HF demodulators 60, 60a (not depicted in FIG. 4) undo the frequency shifts of HF modulators 30, 30a in the two reception channels.

Transformation devices 81, 81a carry out fast Fourier transforms separately for each reception channel in order to ascertain numerical values $b_i$ of the received spectrum RX. The spectra calculated for each reception channel are then divided among the same number of sub-spectra as there are reception channels. In the example shown these are the spectra RX11, RX12 for the first reception channel and the spectra RX21, RX22 for the second reception channel. Spectral values that derive from transmitting antennas other than the one currently being considered are then set to zero.

This is followed by an element-wise division, by way of a normalizing device 82, of all received sub-spectra RX11, RX12, RX21, RX22 by the transmitted spectrum, the result being to carry out a calculation of elements $q_i$ of the spectral normalization.

Transforming devices 83, 83a, 84, 84a then carry out fast Fourier transforms in the distance dimension of the received sub-spectra RX11, RX12, RX21, RX22, and transforming devices 85, 85a, 86, 86a carry out fast Fourier transforms of the received sub-spectra RX21, RX22 in the speed dimension, over multiple measurements.

Echo signals E11, E12 for the first reception path, and echo signals E21, E22 for the second path, are obtained as a result.

Figure 5:
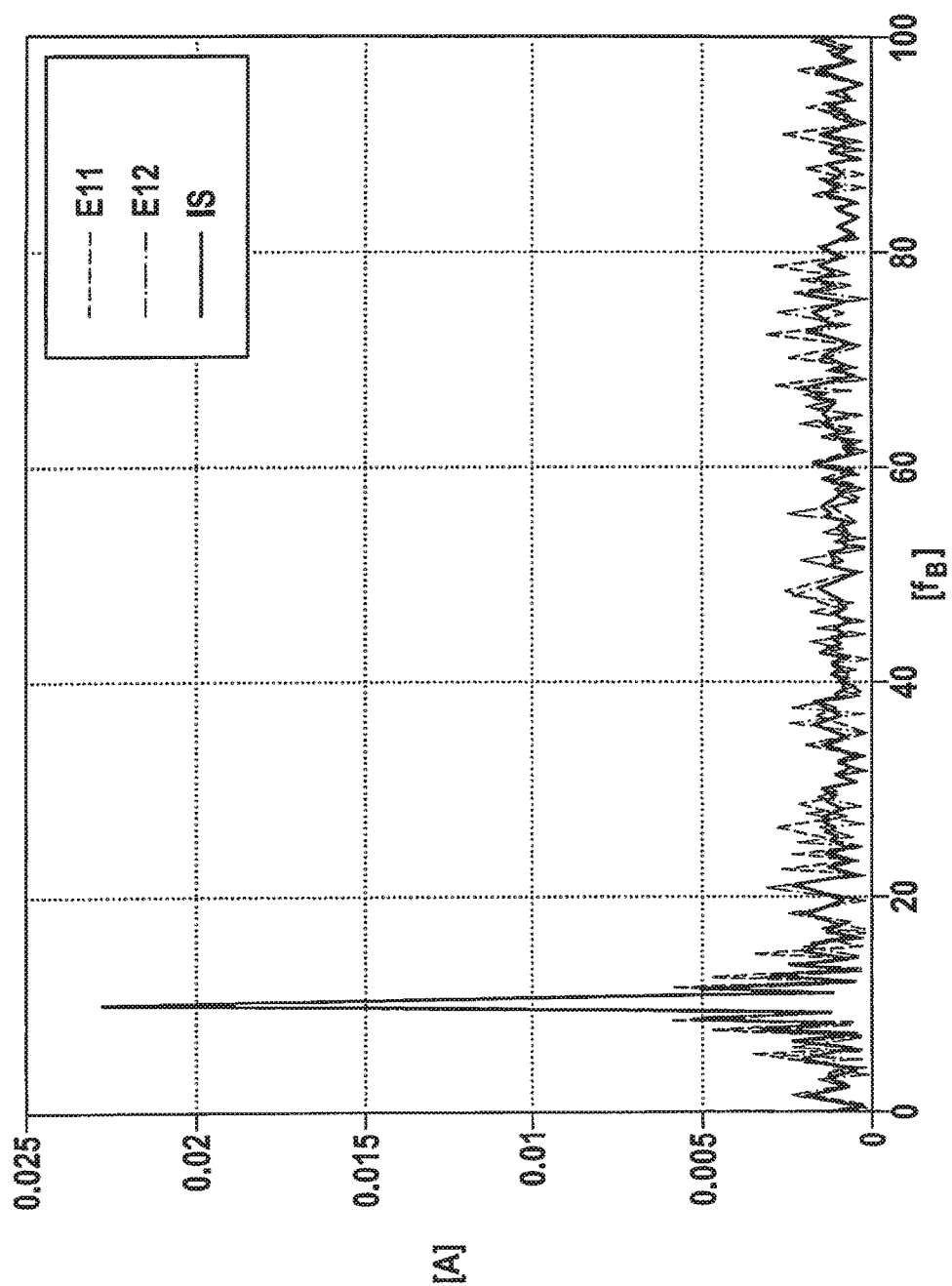
FIG. 5 schematically depicts an evaluation of echo signals of the radar apparatus.

FIG. 5 shows an example of a plot of the two echo signals E11 and E12 in a distance dimension, an amplitude profile being plotted against frequency bins $f_B$. In the absolute-value plot of a non-coherent integrated signal IS, a target 200 is evident in the tenth frequency bin, corresponding to a defined distance value. Because of the nonlinear sampling, certain ambiguities are present in the form of side lobes. These ambiguities result from the fact that the spectral lines $q_i$ exhibit gaps that have been filled with zeroes. But because the sampling grid looks different for different channels and is therefore filled with zeroes at different locations, the Fourier transform produces spectra in which the amplitude peaks belonging to targets 200 are in the same locations in all the channels, but the ambiguities occur at different locations.

In radar apparatus 100 that is proposed, this effect is utilized in order to appreciably reduce the ambiguities. For the evaluation of distance and speed, $(N_{RX} \times N_{TX})$ two-dimensional radar images are available—i.e. the product of a number of transmitting antennas and a number of receiving antennas—and can be used for distance and speed evaluation. They cannot be coherently integrated, however, since they were transmitted and received by different antennas 40, 40a, 50, 50a and thus have different initial phases.

In order to use the information available from all channels, and at the same time to separate distance and speed evaluation from angle estimation, a non-coherent integration of the channels, i.e., an integration of absolute values of the two-dimensional radar images, is carried out. With this method the ambiguities can be substantially suppressed.

FIG. 5 shows qualitatively the result of the aforesaid non-coherent integration of two channels having the echo signals E11 and E12 for a single receiving antenna 50. The greater the number of channels that are integrated, the smaller the ambiguities become, this being reflected in the reduced ripple of the integrated signal IS. Noise is furthermore suppressed by the non-coherent integration, analogously to an averaging operation. The non-coherent integration thus not only prevents ambiguities due to the non-equidistant spectral division, but also suppresses noise; this can have a positive effect on the dynamic range of radar apparatus 100.

FIG. 5 thus shows a plot of the echo signals E11, E12 only in the distance dimensions. The principles that apply in the speed dimension are those of a conventional MIMO radar apparatus.

After non-coherent integration a radar image is produced in which an amplitude peak is present for each target 200. The positions (distance d and speed v) of the largest amplitude peaks are then detected. Based on the individual two-dimensional spectra, the respective complex amplitudes of targets 200 can be inferred at the positions of the amplitude peaks.

The complex amplitudes ascertained in this manner can be used for a subsequent angle estimate, since the profile of the complex amplitudes across the antennas depends on the incidence direction (direction of target 200). A reflection list can thus be available, encompassing the parameters of distance, relative speed, and angle of detected targets 200 in the surroundings. Further parameters of targets 200, e.g., a radar cross section, can advantageously be ascertained in this manner.

Figure 6:
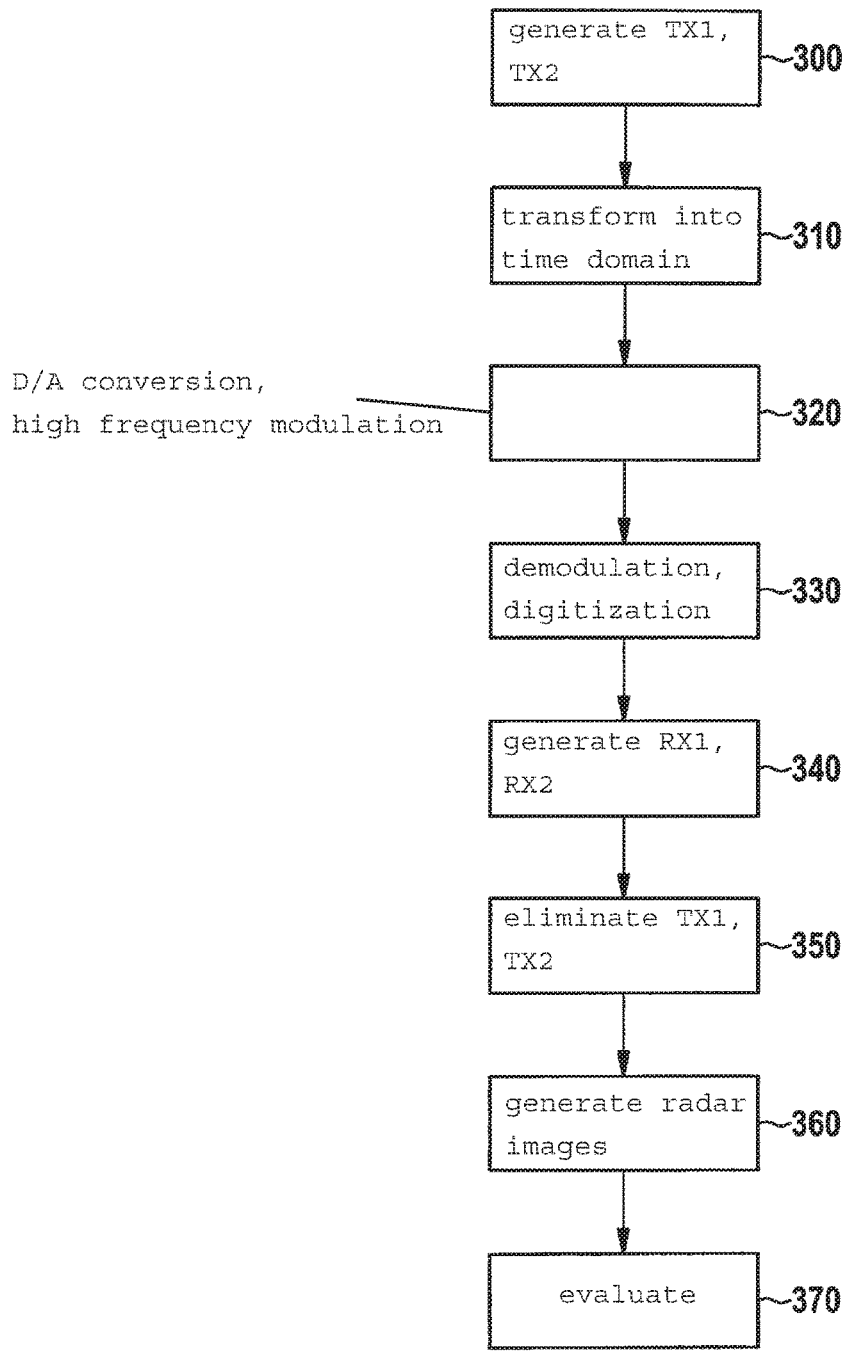
FIG. 6 schematically depicts execution of an embodiment of the method according to the present invention.

FIG. 6 schematically shows execution of an embodiment of the method according to the present invention.

In a step 300 a generation of transmitted spectra TX1, TX2 by complex modulation of mutually equidistant orthogonal OFDM subcarriers is carried out; each transmitted spectrum TX1, TX2 having, for each of the transmitting antennas 40, 40a, a defined number of discrete OFDM subcarriers; all the transmitted spectra TX1, TX2 having substantially the same bandwidth; OFDM subcarriers being divided non-overlappingly and substantially non-equidistantly among the transmitted spectra TX1, TX2; each transmitted spectrum TX1, TX2 having at least two directly adjacent OFDM subcarriers.

In a step 310 a transformation of the transmitted spectra TX1, TX2 into the time domain is carried out.

In a step 320 a digital/analog conversion, a high-frequency modulation of the transmitted spectra TX1, TX2, and simultaneous emission of the modulated transmitted spectra TX1, TX2 via transmitting antennas 40, 40a, are carried out.

In a step 330 a demodulation and digitization of a received signal received by one of the receiving antennas 50 is carried out.

In a step 340 a generation of one received spectrum RX1, RX2 per transmitted spectrum TX1, TX2 is carried out, a division of the OFDM subcarriers in accordance with their division in the transmitted spectra TX1, TX2 being carried out.

In a step 350 an elimination of the transmitted signal forms of the transmitted spectra TX1, TX2 from the received spectra RX1, RX2 is carried out.

In a step 360 a generation of one radar image per received spectrum RX1, RX2 is carried out.

Lastly, in a step 370 an evaluation of the radar images in a distance dimension and in a speed dimension, and execution of a signal evaluation for the received signal, are carried out.

The present invention advantageously furnishes a combination of MIMO radar with OFDM technology, having a distance domain that can measured in optimum fashion along with maximum possible separation capability. The improved angle estimation of a MIMO system is retained, since resources in terms of distance estimation and speed estimation are not diminished.

One skilled in the art will suitably modify the above-described features of the present invention, and combine them with one another, without departing from the essence of the present invention.

What is claimed is:

1. A method for operating a radar apparatus having at least two transmitting antennas and at least one receiving antenna, the method comprising:
    generating a plurality of sub-spectra from a transmission spectrum of discrete orthogonal OFDM subcarriers that are mutually equidistant from each other so that each pair of immediately adjacent ones of the subcarriers are offset by a same frequency amount from each other, wherein:
        the generating is performed by dividing the transmission spectrum into a plurality of sub-spectra, each of which is assigned to a respective one of the transmitting antennas and includes a respective subset of the OFDM subcarriers;
        all of the sub-spectra have substantially the same bandwidth; and
        the OFDM subcarriers of the transmission spectrum are divided non-overlappingly and substantially non-equidistantly among the transmitted sub-spectra such that:
            none of the OFDM subcarriers of the transmission spectrum are in more than one of the sub-spectra; and
            with respect to each of the sub-spectra:
                at least two different pairs of immediately adjacent ones of the OFDM subcarriers of the respective sub-spectrum are offset by different frequency amounts from each other; and
                the respective sub-spectrum includes at least one pair of immediately adjacent ones of the OFDM subcarriers of the transmission spectrum;
    transforming the sub-spectra into the time domain;
    digital/analog converting and high-frequency modulating the sub-spectra;
    simultaneously transmitting the modulated sub-spectra by way of the transmitting antennas;
    demodulating and digitizing a received signal received by the receiving antenna;
    generating one received spectrum per transmitted sub-spectrum, a division of the OFDM subcarriers corresponding to their division in the transmitted sub-spectra being carried out;
    eliminating transmitted signal forms of the sub-spectra from the received spectra;
    generating one radar image per received spectrum;
    evaluating the radar images in a distance dimension and in a speed dimension; and
    carrying out a signal evaluation for the received signal.

2. The method as recited in claim 1, wherein for peak values of the radar images, an angle estimate for an ascertained target is carried out.

3. The method as recited in claim 1, wherein the non-equidistant OFDM subcarriers are disposed pseudo-randomly in the sub-spectra.

4. The method as recited in claim 1, wherein the number of OFDM subcarriers of the transmission spectrum is a power of two.

5. The method as recited in claim 1, wherein one of the sub-spectra that is transformed into the time domain is modified during a measurement operation, or the assignment of the sub-spectra to the transmitting antennas is modified during a measurement operation.

6. The method as recited in claim 1, wherein a radar cross section of a target is estimated.

7. A radar apparatus, comprising:
    at least two transmitting antennas;
    a generating device configured to generate a plurality of sub-spectra from a transmission spectrum of discrete orthogonal OFDM subcarriers that are mutually equidistant from each other so that each pair of immediately adjacent ones of the subcarriers are offset by a same frequency amount from each other, wherein:
        the generation is performed:
            by dividing the transmission spectrum into a plurality of sub-spectra, each of which is assigned to a respective one of the transmitting antennas and includes a respective subset of the OFDM subcarriers; and
        such that:
            all of the sub-spectra have substantially the same bandwidth; and
            the OFDM subcarriers of the transmission spectrum are divided non-overlappingly and substantially non-equidistantly among the sub-spectra such that:
                none of the OFDM subcarriers of the transmission spectrum are in more than one of the sub-spectra; and
                with respect to each of the sub-spectra:
                    at least two different pairs of immediately adjacent ones of the OFDM subcarriers of the respective sub-spectrum are offset by different frequency amounts from each other; and
                    the respective sub-spectrum includes at least one pair of immediately adjacent ones of the OFDM subcarriers of the transmission spectrum; and
    the radar apparatus is configured for the at least two transmitting antennas to simultaneously transmit the sub-spectra;
    a first processing device configured to digital/analog convert and high-frequency modulate the sub-spectra;
    at least one receiving antenna for receiving a received signal;
    a second processing device configured to demodulate and analog/digital convert the received signal; and
    an evaluation device to:
        generate from the received signal a respective received spectrum per transmitted sub-spectrum, wherein a division of the OFDM subcarriers among the received spectra correspond to their division in the transmitted sub-spectra;
eliminate transmitted signal forms of the transmitted sub-spectra from the received spectra,
generate one radar image per transmit/receive path;
evaluate the radar images in a distance dimension and in a speed dimension; and
perform further signal processing of the received signal.

8. The radar apparatus as recited in claim 7, wherein the evaluation device carries out, for detected peak values of the radar images, an angle estimate for an ascertained target.

9. A non-transitory computer-readable storage medium storing a computer program that is executable on an electronic control device and that, when executed on the electronic control device, causes the electronic control device to perform a method for operating a radar apparatus having at least two transmitting antennas and at least one receiving antenna, the method comprising:
generating a plurality of sub-spectra from a transmission spectrum of discrete orthogonal OFDM subcarriers that are mutually equidistant from each other so that each pair of immediately adjacent ones of the subcarriers are offset by a same frequency amount from each other, wherein:
the generating is performed by dividing the transmission spectrum into a plurality of sub-spectra, each of which is assigned to a respective one of the transmitting antennas and includes a respective subset of the OFDM subcarriers;
all of the sub-spectra have substantially the same bandwidth; and
the OFDM subcarriers of the transmission spectrum are divided non-overlappingly and substantially non-equidistantly among the sub-spectra such that:
none of the OFDM subcarriers of the transmission spectrum are in more than one of the sub-spectra; and
with respect to each of the sub-spectra:
at least two different pairs of immediately adjacent ones of the OFDM subcarriers of the respective sub-spectrum are offset by different frequency amounts from each other; and
the respective sub-spectrum includes at least one pair of immediately adjacent ones of the OFDM subcarriers of the transmission spectrum;
transforming the sub-spectra into the time domain;
digital/analog converting and high-frequency modulating the sub-spectra;
simultaneously transmitting the modulated sub-spectra by way of the transmitting antennas;
demodulating and digitizing a received signal received by the receiving antenna;
generating one received spectrum per transmitted sub-spectrum, a division of the OFDM subcarriers corresponding to their division in the transmitted sub-spectra being carried out;
eliminating transmitted signal forms of the sub-spectra from the received spectra;
generating one radar image per received spectrum;
evaluating the radar images in a distance dimension and in a speed dimension; and
carrying out a signal evaluation for the received signal.

* * * * *